(12) United States Patent
Dantrey et al.

(10) Patent No.: US 12,283,187 B2
(45) Date of Patent: *Apr. 22, 2025

(54) EMERGENCY RESPONSE VEHICLE DETECTION FOR AUTONOMOUS DRIVING APPLICATIONS

(71) Applicant: NVIDIA Corporation, Santa Clara, CA (US)

(72) Inventors: Ambrish Dantrey, Pune (IN); Atousa Torabi, Santa Clara, CA (US); Anshul Jain, San Jose, CA (US); Ram Ganapathi, San Jose, CA (US); Abhijit Patait, Pune (IN); Revanth Reddy Nalla, Maharashtra (IN); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,287

(22) Filed: Sep. 6, 2023

(65) Prior Publication Data

US 2023/0410650 A1 Dec. 21, 2023

Related U.S. Application Data

(63) Continuation of application No. 16/951,224, filed on Nov. 18, 2020, now Pat. No. 11,816,987.

(51) Int. Cl.
*G08G 1/0965* (2006.01)
*G06N 3/048* (2023.01)
(Continued)

(52) U.S. Cl.
CPC .......... *G08G 1/0965* (2013.01); *G06N 3/048* (2023.01); *G08G 1/096708* (2013.01); *H04R 3/005* (2013.01); *H04R 2430/20* (2013.01)

(58) Field of Classification Search
CPC ................. G05D 1/0255; G08G 1/166; G08G 1/096708; G08G 1/0965
See application file for complete search history.

(56) References Cited

U.S. PATENT DOCUMENTS

| 9,568,995 B1 * | 2/2017 | Lian ........................ G06F 3/012 |
| 10,885,698 B2 | 1/2021 | Muthler et al. |

(Continued)

FOREIGN PATENT DOCUMENTS

| CN | 107633684 A | 1/2018 |
| CN | 110168625 A | 8/2019 |

(Continued)

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.

(Continued)

*Primary Examiner* — Mirza F Alam
(74) *Attorney, Agent, or Firm* — Taylor English Duma L.L.P.

(57) ABSTRACT

In various examples, audio alerts of emergency response vehicles may be detected and classified using audio captured by microphones of an autonomous or semi-autonomous machine in order to identify travel directions, locations, and/or types of emergency response vehicles in the environment. For example, a plurality of microphone arrays may be disposed on an autonomous or semi-autonomous machine and used to generate audio signals corresponding to sounds in the environment. These audio signals may be processed to determine a location and/or direction of travel of an emergency response vehicle (e.g., using triangulation). Additionally, to identify siren types—and thus emergency response vehicle types corresponding thereto—the audio signals may be used to generate representations of a fre- (Continued)

quency spectrum that may be processed using a deep neural network (DNN) that outputs probabilities of alert types being represented by the audio data.

20 Claims, 11 Drawing Sheets

(51) Int. Cl.
  *G08G 1/0967* (2006.01)
  *H04R 3/00* (2006.01)

(56) References Cited

U.S. PATENT DOCUMENTS

| | | | |
|---|---|---|---|
| 11,099,558 | B2 | 8/2021 | Huang et al. |
| 11,816,987 | B2 | 11/2023 | Dantrey et al. |
| 2016/0155452 | A1 | 6/2016 | Sharifi et al. |
| 2017/0249839 | A1 | 8/2017 | Becker et al. |
| 2017/0305427 | A1 | 10/2017 | Kim et al. |
| 2019/0027032 | A1 | 1/2019 | Arunachalam |
| 2019/0049989 | A1 | 2/2019 | Akotkar et al. |
| 2020/0139973 | A1* | 5/2020 | Palanisamy ............ G08G 1/167 |
| 2020/0241552 | A1 | 7/2020 | Leenayongwut et al. |
| 2022/0122620 | A1* | 4/2022 | Watkins ................. G10L 25/30 |
| 2022/0272448 | A1* | 8/2022 | Rajkumar ............ B60W 50/00 |
| 2022/0363261 | A1* | 11/2022 | Buck ................ B60W 60/0015 |

FOREIGN PATENT DOCUMENTS

| | | | |
|---|---|---|---|
| CN | 110800031 | A | 2/2020 |
| WO | 2018201349 | A1 | 11/2018 |

OTHER PUBLICATIONS

ISO 26262, "Road vehicle—Functional safety," International standard for functional safety of electronic system, https://en.wikipedia.org/wiki/ISO_26262, accessed on Sep. 13, 2021, 8 pgs.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

Dantrey, Ambrish; Non-Final Office Action for U.S. Appl. No. 16/951,224, filed Nov. 18, 2020, mailed Dec. 29, 2022, 32 pgs.

Dantrey, Ambrish; Applicant-Initiated Interview Summary for U.S. Appl. No. 16/951,224, filed Nov. 18, 2020, mailed Mar. 1, 2023, 2 pgs.

Dantrey, Ambrish; Final Office Action for U.S. Appl. No. 16/951,224, filed Nov. 18, 2020, mailed Apr. 17, 2023, 28 pgs.

Dantrey, Ambrish; Advisory Action for U.S. Appl. No. 16/951,224, filed Nov. 18, 2020, mailed Jun. 2, 2023, 4 pgs.

Dantrey, et al.; Non-Final Office Action for U.S. Appl. No. 16/951,224, filed Nov. 18, 2020, mailed Jun. 21, 2023, 18 pgs.

Dantrey, et al.; Notice of Allowance for U.S. Appl. No. 16/951,224, filed Nov. 18, 2020, mailed Aug. 9, 2023, 9 pgs.

Dantrey, et al.; First Office Action for German Patent Application No. 10 2021 129 528.9, filed Nov. 12, 2021, mailed Oct. 24, 2022, 14 pgs.

Dantrey, Ambrish; First Office Action for Chinese Patent Application No. 202111384092.4, filed Nov. 15, 2021, mailed Dec. 25, 2024, 17 pgs.  English Abstract Included .

* cited by examiner

EMERGENCY RESPONSE VEHICLE DETECTION FOR AUTONOMOUS DRIVING APPLICATIONS

CROSS-REFERENCE TO RELATED APPLICATIONS

This application is a continuation of U.S. patent application Ser. No. 16/951,224, filed Nov. 19, 2020, which is incorporated herein by reference in its entirety.

BACKGROUND

Designing a system to pilot a vehicle autonomously and safely without supervision is tremendously difficult. An autonomous vehicle should at least be capable of performing as a functional equivalent of an attentive driver—who draws upon a perception and action system that has an incredible ability to identify and react to moving and static obstacles in a complex environment—to avoid colliding with other objects or structures along the path of the vehicle. In addition, in order to operate fully autonomously, the vehicle should be capable of following rules or conventions of the road, which includes obeying rules related to emergency response vehicles. For example, depending on geographic location, various rules or conventions may be in place, such as to pull to the side of the road and/or come to a stop when an emergency response vehicle is detected.

Some conventional systems attempt to identify emergency response vehicles using perception of the ego-vehicle. For example, various sensor types—e.g., LiDAR, RADAR, camera, etc.—may be used to detect emergency response vehicles when perceivable by the ego-vehicle. However, these systems may have difficulty identifying emergency response vehicles—or at least identifying emergency response vehicles with enough time to react—due to the many occlusions in the environment. For example, where an emergency response vehicle is approaching an intersection that is occluded by a building or other structure, the ego-vehicle may not perceive the emergency response vehicle until the vehicle has also entered the intersection. At this point, it may be too late for the ego-vehicle to perform a maneuver that complies with local rules, and thus may reduce the overall safety of the situation and/or impede the movement of the emergency response vehicle.

SUMMARY

Embodiments of the present disclosure relate to emergency response vehicle detection for autonomous driving applications. Systems and methods are disclosed that detect and classify alerts—such as, for example and without limitation: sirens, alarms, horns, and other patterns of produced sound emitted by emergency response vehicles—from audio captured using microphones of an autonomous or semi-autonomous vehicle in order to identify travel directions, locations, and/or types of emergency response vehicles in the environment. For example, a plurality of microphones—or microphone arrays—may be disposed on a vehicle and used to generate audio signals corresponding to sounds in the environment. These audio signals may be processed—e.g., using background noise suppression, beamforming, and/or other pre-processing operations—to determine a location and/or direction of travel of an emergency response vehicle (e.g., using triangulation). To further increase the quality of the audio data, the microphones may be mounted on various locations around the vehicle (e.g., front, rear, left, right, interior, etc.) and/or include physical structures that aid in audio quality—such as wind shields to avoid wind force on the microphones.

To identify siren types—and thus emergency response vehicle types corresponding thereto—the audio signals may be converted to a frequency domain by extracting Mel frequency coefficients to generate Mel-spectrograms. The Mel-spectrograms may be processed using a deep neural network (DNN)—such as a convolutional recurrent neural network (CRNN)—that outputs confidences or probabilities that various alert types used by emergency response vehicles are represented by the audio data. Due to the spatial and temporal nature of alerts, the use of convolutional layers for feature extraction and recurrent layers for temporal feature identification increase the accuracy of the DNN. For example, the DNN may operate on a window of audio data while retaining states—e.g., using a gated recurrent unit (GRU)—in order to allow for a more lightweight and accurate DNN that accounts for the spatial and temporal audio profile of sirens. In addition, attention may be applied to the outputs of the temporal feature extraction layers to determine the probabilities of each type of emergency responder alert within the window as a whole—e.g., to give higher weights to detected alert patterns irrespective of their temporal location within the window. To train the DNN for accuracy across varying driving conditions—e.g., rain, wind, traffic, in-tunnel, open air, etc.—audio data from varying alert types may be augmented using time stretch, time shift, pitch shift, dynamic range compression, noise augmentation at different signal-to-noise ratios (SNRs), etc. to generate a more robust training data set that accounts for echoes, reverberations, attenuation, Doppler effects, and/or other effects of environmental physics. As such, once deployed, the DNN may accurately predict emergency responder alert types across a variety of operating conditions.

Ultimately, using the locations, direction of travel, and alert type may allow the vehicle to identify an emergency response vehicle and to make planning and/or control decisions in response that comply with local rules or conventions. In addition, by using audio (and perception, in embodiments) rather than perception alone, emergency response vehicles may be identified at an earlier time regardless of occlusion, thereby allowing the vehicle to make planning decisions in advance that contribute to the overall safety of the situation.

BRIEF DESCRIPTION OF THE DRAWINGS

The present systems and methods for emergency response vehicle detection for autonomous driving applications are described in detail below with reference to the attached drawing figures, wherein.

DETAILED DESCRIPTION

Systems and methods are disclosed related to emergency response vehicle detection for autonomous driving applications. Although the present disclosure may be described with respect to an example autonomous vehicle 500 (alternatively referred to herein as "vehicle 500" or "ego-vehicle 500," an example of which is described herein with respect to FIGS. 5A-5D), this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics, aerial systems, boating systems (e.g., emergency watercraft identification), simulation environments (e.g., emergency response vehicle detection of virtual vehicles within a virtual simulation environment), and/or other technology areas.

Figure 1A:
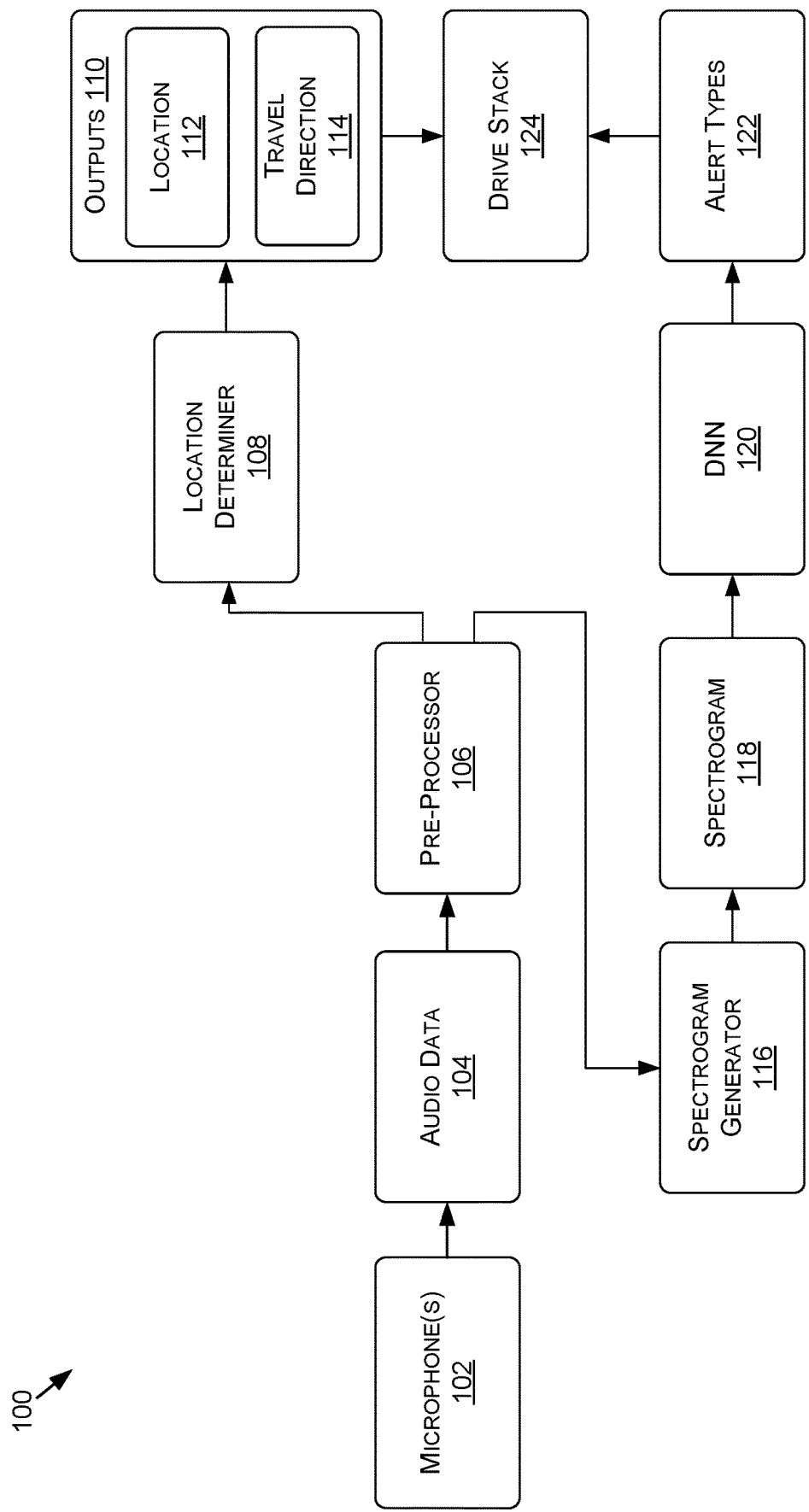
FIG. 1A depicts a data flow diagram of a process for emergency response vehicle detection, in accordance with embodiments of the present disclosure.

With reference to FIG. 1A, FIG. 1A depicts a data flow diagram of a process 100 for emergency response vehicle detection, in accordance with embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Figure 2:
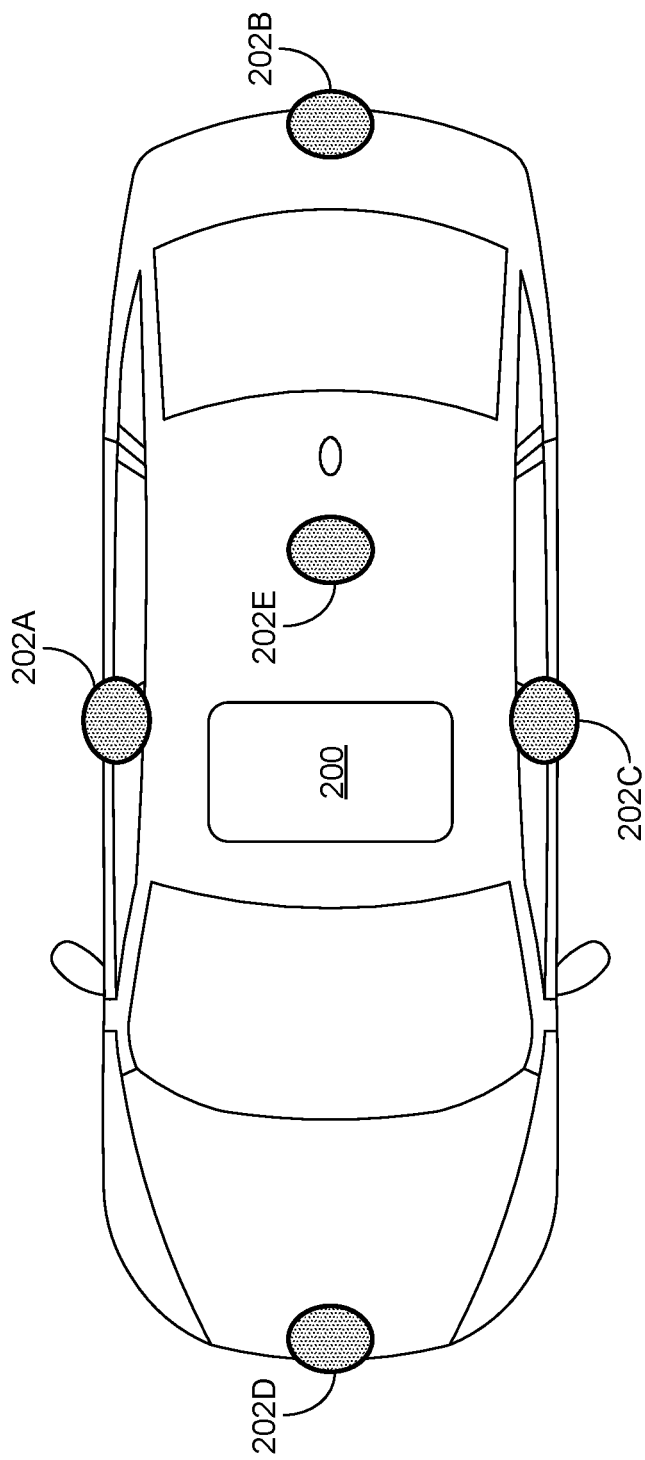
FIG. 2 depicts an example arrangement of microphone arrays on a vehicle, in accordance with embodiments of the present disclosure.
Figure 5A:
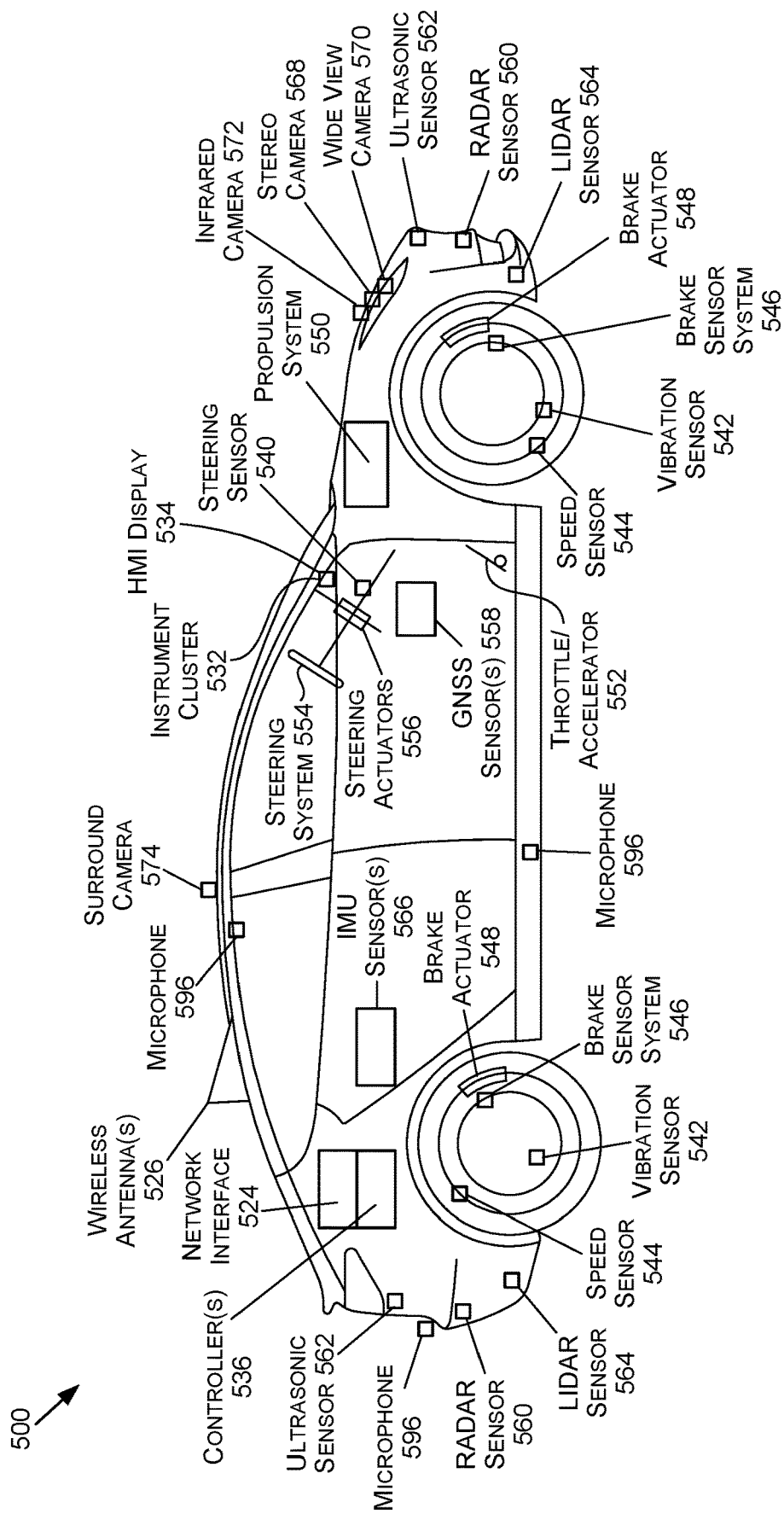
FIG. 5A is an illustration of an example autonomous vehicle, in accordance with some embodiments of the present disclosure.
Figure 5B:
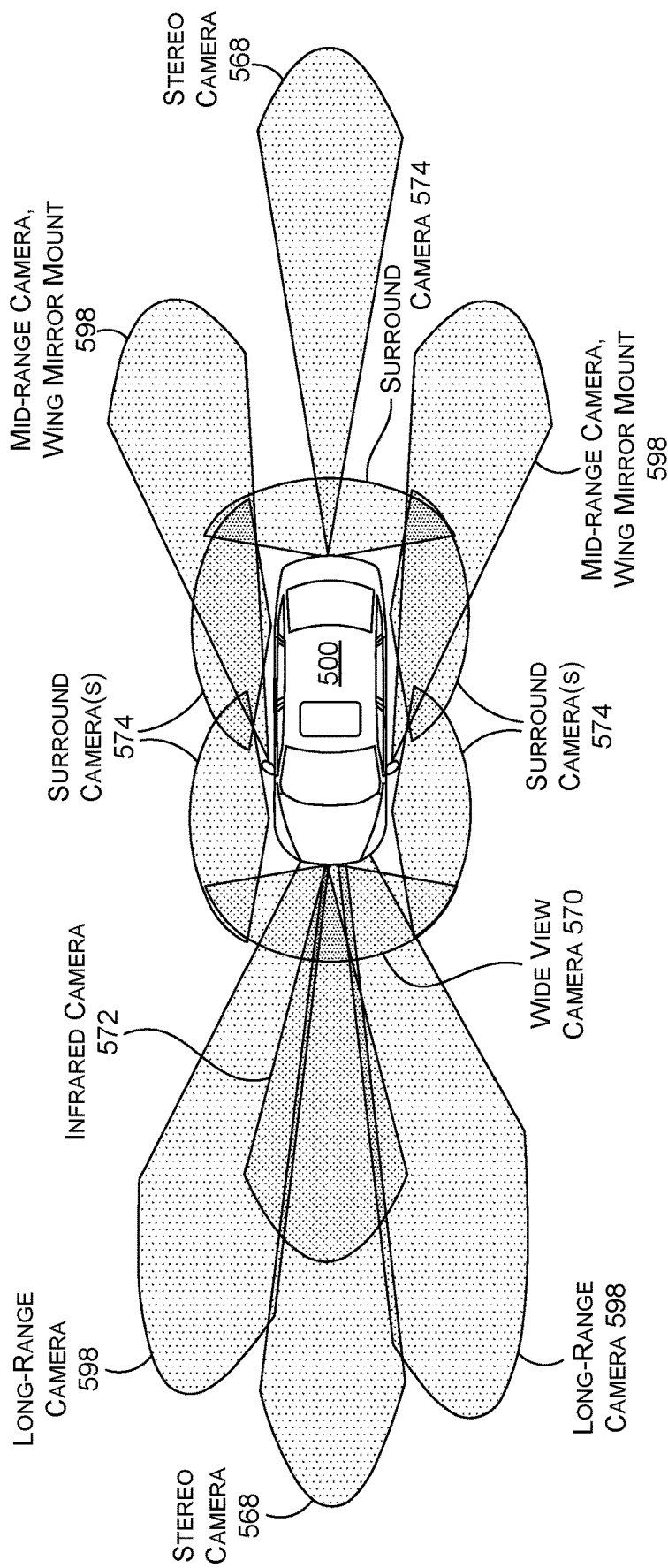
FIG. 5B is an example of camera locations and fields of view for the example autonomous vehicle of FIG. 5A, in accordance with some embodiments of the present disclosure.
Figure 5C:
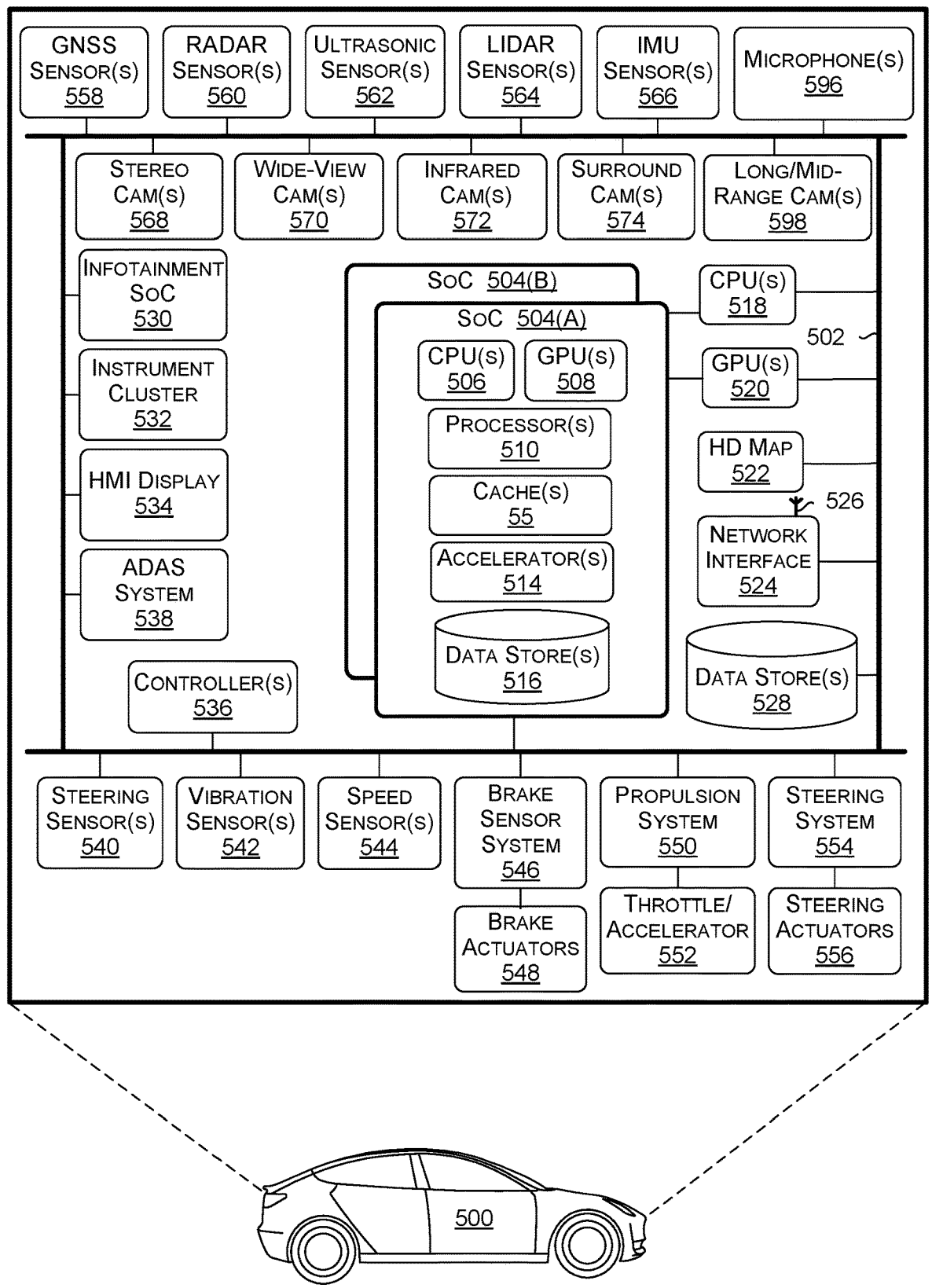
FIG. 5C is a block diagram of an example system architecture for the example autonomous vehicle of FIG. 5A, in accordance with some embodiments of the present disclosure.

The process 100 includes one or more microphones 102 (which may be similar to microphone(s) 596 of FIGS. 5A and 5C) generating audio data 104. For example, any number of microphones 102 may be used and mounted or otherwise disposed on the vehicle 500 in any arrangement. As a non-limiting example, and with respect to FIG. 2, various microphone arrays 202A-202D may be mounted on a vehicle 200 (which may be similar to the vehicle 500 of FIGS. 5A-5D, in embodiments). The microphone arrays 202A-202D may each include a plurality of microphones—e.g., two, three, four, etc.—and each microphone may include a unidirectional, omnidirectional, or other type of microphone. Different configurations of the microphone arrays 202 may be used. For example, a rectangular arrangement of four microphones in each array may be used—e.g., including a microphone positioned at each vertex of a square and soldered on a printed circuit board (PCB). As another example, a circular array of seven microphones may be used, including six microphones in a circle and one in the center.

Various positions of the microphone arrays 202 may be used, depending on the embodiments. Due to the vehicle 200 itself acting as a sound barrier, the microphone array(s) 202 may be positioned such that the vehicle 200 has a minimal impact on the occluding sirens. As such, by including microphone arrays 202 on each side (front, back, left, right) of the vehicle 200, the vehicle 200 may not act as a barrier for at least one of the microphone arrays 202—thereby leading to a higher quality audio signal and thus more accurate predictions. For example, four microphone arrays 202A-202D may be used, one in the front, back, left, and right of the vehicle 200. As another example, an addition, fifth microphone array 202E may be positioned on the top of the vehicle. In an embodiment, only a single microphone array may be used on the top of the vehicle 200—e.g., microphone array 202E—which may result in more exposure to wind, rain, dust, etc. In other examples, there may be more or less microphone arrays 202 used in different locations on the vehicle 200. For example, in some embodiments, microphones and/or microphone arrays 202 may be disposed interior to the vehicle 500 such that the resulting audio signals generated from in-cabin of the vehicle 500 may be compared to known or learned audio signals for alerts or sirens of emergency response vehicles within cabins of a vehicle 500.

The microphone arrays 202 may be positioned at different locations on (e.g., corresponding to different portions of the vehicle 200) the vehicle 200. For example, on a left or right side of the vehicle 200, the microphone arrays 202 may be positioned below the side view mirrors or below the door handles, and on the front or back of the vehicle 200, the microphone arrays 202 may be positioned near the rear license plate, near the rear view camera, near a front license plate, above or below the windshield, and/or at another location. In some embodiments, positioning the microphones in these locations may subject the microphone arrays 202 to less dust, water, and/or wind during operation. For example, the rear view camera location is generally positioned within a cavity where the license plate is located, which may prevent water and dust from accumulating on the microphone array 202. Similarly, below the rear view mirrors or the door handles may provide protection against dust, wind, and/or water.

Each microphone array 202 may be disposed in a housing, and the housing may be disposed on the vehicle 200. As such, the housing will be disposed external to the vehicle 200, and thus may be designed to withstand dust and moisture ingression in order to reduce or eliminate erosion or degradation of the microphones within each microphone array 202. In some embodiments, to withstand dust and moisture, the membrane or fabric covering of each housing may be constructed of a material—e.g., hydrophobic foam spray, moisture and dust resistant complex synthetic fiber, etc.—that does not significantly attenuate audio signals while at the same time providing adequate protection against rain, snow, dirt, and dust. In some embodiments, to avoid wind force on the microphone arrays 202, the microphone arrays 202 may each include one or more wind shields.

In some embodiments, the microphones may include automotive-grade digital micro-electro-mechanical system (MEMS) microphones connected to an automotive audio bus (A2B) transceiver device using pulse density modulation (PDM)—e.g., in order to simplify the microphone topology in the vehicle 200. For example, this configuration may enable the capturing of audio signals from one or more microphones mounted on the exterior of the vehicle 200 using a low-cost and lightweight twisted pair (TP) cabling. In such an embodiment, siren frequencies from emergency response vehicles at any point with a radius of the vehicle 200 may be represented by over-sampled 1-bit PDM audio streams connected to each A2B transceiver device in a daisy-chained configuration. The audio data 104 may be converted to multi-channel time-division multiplexing (TDM) data by the secondary node A2B transceiver before being passed or transferred upstream (e.g., in a direction toward an electrical control unit (ECU) including the A2B primary node device) to its nearest neighbor A2B node in the daisy-chain. For example, the A2B secondary node transceiver closest to a system that aggregates TDM data from each of the microphones (e.g., each microphone from each microphone array 202) prior to transferring the TDM data to the A2B primary node. The A2B primary node may transfer the audio data 104 to another component of the system, such as a system on chip (SoC)—e.g., SoC(s) 504 of FIG. 5C—over a TDM audio port. Control channel commands may be sent to the A2B nodes over an inter-integrated circuit (I2C) interface between the SoC(s) and the A2B transceiver(s) using TP cable. Each secondary node may include an A2B transceiver and one or more PDM microphones that may be remotely powered in a way that enough current can be supplied to all connected nodes using a same TP cable.

The audio data 104 may, in embodiments, undergo pre-processing using a pre-processor 106. For example, one or more background noise suppression algorithms may be used to suppress ambient noises like wind, vehicle noises, road noises, and/or the like. For example, one or more beamforming algorithms may be executed to perform background noise suppression for audio data 104 generated by each microphone array 202. As used herein, audio data 104 may refer to raw audio data and/or pre-processed audio data.

In some embodiments, the audio data 104—e.g., after pre-processing—may be used by the location determiner 108 to determine outputs 110. For example, the location determiner 108 may use one or more (e.g., passive) acoustic location algorithms—e.g., acoustic triangulation—to determine a location 112 and/or travel direction 114 of an emergency response vehicle(s). The location determiner 108 may analyze the audio data 104 from each of a plurality—e.g., three or more—of microphone arrays 202 using acoustic triangulation to determine a distance (e.g., from the vehicle 200) and/or direction (e.g., a range of angles defining a region of the environment that an emergency response vehicle(s) is located) in order to determine the location 112 of the emergency response vehicle(s). For example, acoustic triangulation may be used to determine an estimated distance of the emergency response vehicle(s) from the vehicle 200 and an estimated source direction of the alert(s) of the emergency response vehicle(s). The more microphones, or microphone arrays 202, used, the more accurate the triangulation may be. However, using four microphone arrays 202 (e.g., 202A-202D of FIG. 2) may allow for accuracy within thirty degrees or less, which may be suitable for locating and reacting to an emergency response vehicle(s). In other embodiments, there may be more or less microphone arrays 202 used, and the accuracy may vary as a result (e.g., to within forty degrees, twenty-five degrees, ten degrees, etc.). For a non-limiting example, due to the geometry and general layout of road systems, an accuracy within thirty degrees—in addition to a distance measure—may allow the vehicle 500 to identify which road the emergency response vehicle(s) is located on with enough accuracy to respond according to rules and conventions of the locality. As such, when approaching a four-way intersection, an estimated location and distance may allow the vehicle 500 to determine that the emergency response vehicle(s) is on the road entering the intersection from the left, and the travel direction 114—described in more detail herein—may be used to determine the direction of travel of the emergency response vehicle(s) on the road. As such, where the emergency response vehicle(s) is traveling away from the intersection, the vehicle 500 may determine to continue through the intersection without accounting for the emergency response vehicle(s), while if the emergency response vehicle is traveling toward the intersection, the vehicle 500 may determine to pull to the side of the road and stop until the emergency response vehicle(s) has cleared the intersection (in an example where pulling to the side of the road and stopping is the local rule or convention). As a result, in some embodiments, knowledge of the road layout (e.g., determined using a GNSS map, a high definition (HD) map, vehicle perception, etc.) may additionally be used to determine the location 112 and/or travel direction 114.

The travel direction 114 may be determined by the location determiner 108 by tracking locations 112 of the emergency response vehicle(s) over time—e.g., over a plurality of frames or time steps. For example, a change (e.g., increase or decrease) in the sound pressure, particle velocity, sound or audio frequencies, and/or other physical quantities of the sound field as represented by the audio data 104 may indicate that the emergency response vehicle(s) is approaching (e.g., increase in sound pressure) or moving away (e.g., decrease in sound pressure).

In addition to, or alternatively from, the location 112 and travel direction 114, the process 100 may include determining emergency vehicle alert types 122 using deep learning. For example, the audio data 104—e.g., before and/or after pre-processing by the pre-processor 106—may be analyzed by a spectrogram generator 116 to generate a spectrogram 118. In some embodiments, a spectrogram 118 may be generated for each microphone array 202, and N instances (where N corresponds to the number of microphone arrays 202) of the DNN 120 may be used to compute N different outputs corresponding to siren types 122. In other embodiments, N input channels corresponding to spectrograms 118 from respective microphone arrays 202 may be input to a same DNN 120 to compute the siren types 122. In further embodiments, the N signals from respective microphone arrays 202 may be pre-processed and/or augmented to generate a single spectrogram 118, and the single spectrogram 118 may be used as input for the DNN 120.

To generate the spectrogram(s) 118, the audio data 104 from each microphone array 202 may be converted—by the spectrogram generator 116—to the frequency domain by extracting Mel frequency coefficients. The Mel frequency coefficients may be used to generate the spectrogram 118 which may be used as input to one or more deep neural networks (DNNs) 120 to compute outputs (e.g., confidences, probabilities, etc.) indicative of siren types 122. For example, the audio data 104—e.g., a digital representation of samples of air pressure over time—may be sampled within windows of some predetermined size (e.g., 1024, 2048, etc.), making hops of a predetermined size (e.g., 256, 512, etc.) each time to sample a next window. A fast Fourier transform (FFT) may be computed for each window to transform data from time domain to frequency domain. The entire frequency spectrum may then be separated or partitioned into bins—e.g., 120 bins—and each bin may be transformed into a corresponding Mel bin in the Mel scale. For each window, the magnitude of the signal may be decomposed into its components corresponding to the frequency in the Mel Scale. As such, a y-axis corresponding to frequency may be converted to a log scale and a color dimension corresponding to amplitude may be converted to decibels to form a spectrogram and, in embodiments, the y-axis corresponding to the frequency may be mapped onto the Mel scale to form the Mel spectrogram. As such, the spectrogram 118 may correspond to a spectrogram and/or a Mel spectrogram.

The spectrogram 118—e.g., tradition or Mel—may be provided as input to the DNN 120. The DNN 120 may include a convolutional recurrent neural network (CRNN), in embodiments; however, this is not intended to be limiting. For example, and without limitation, the DNN(s) 120 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of machine learning models.

A CRNN may be used as the DNN 120 to account for both the spatial and temporal nature of emergency alerts—such as sirens, alarms, or vehicle horn patterns. For example, each alert may be generated by an instrument or audio emitting device on an emergency response vehicle to have a fixed pattern. Each emergency response vehicle may have different alert types, as well, depending on the current state or situation (e.g., an ambulance may have a first alert when heading toward a scene without knowledge of the severity, but may have a second alert when driving to the hospital transporting a patient with only minor injury). In addition, two different alerts may have a same signal, but one signal may stretch over a longer period of time than another, so identifying this difference is important for accurate classification of the siren types 122. As such, the CRNN may account for these fixed patterns by not only looking at the frequencies, amplitudes, and/or other sound representations, but also by looking at the amount of time each of these sound representations are detected over a time window.

Figure 1B:
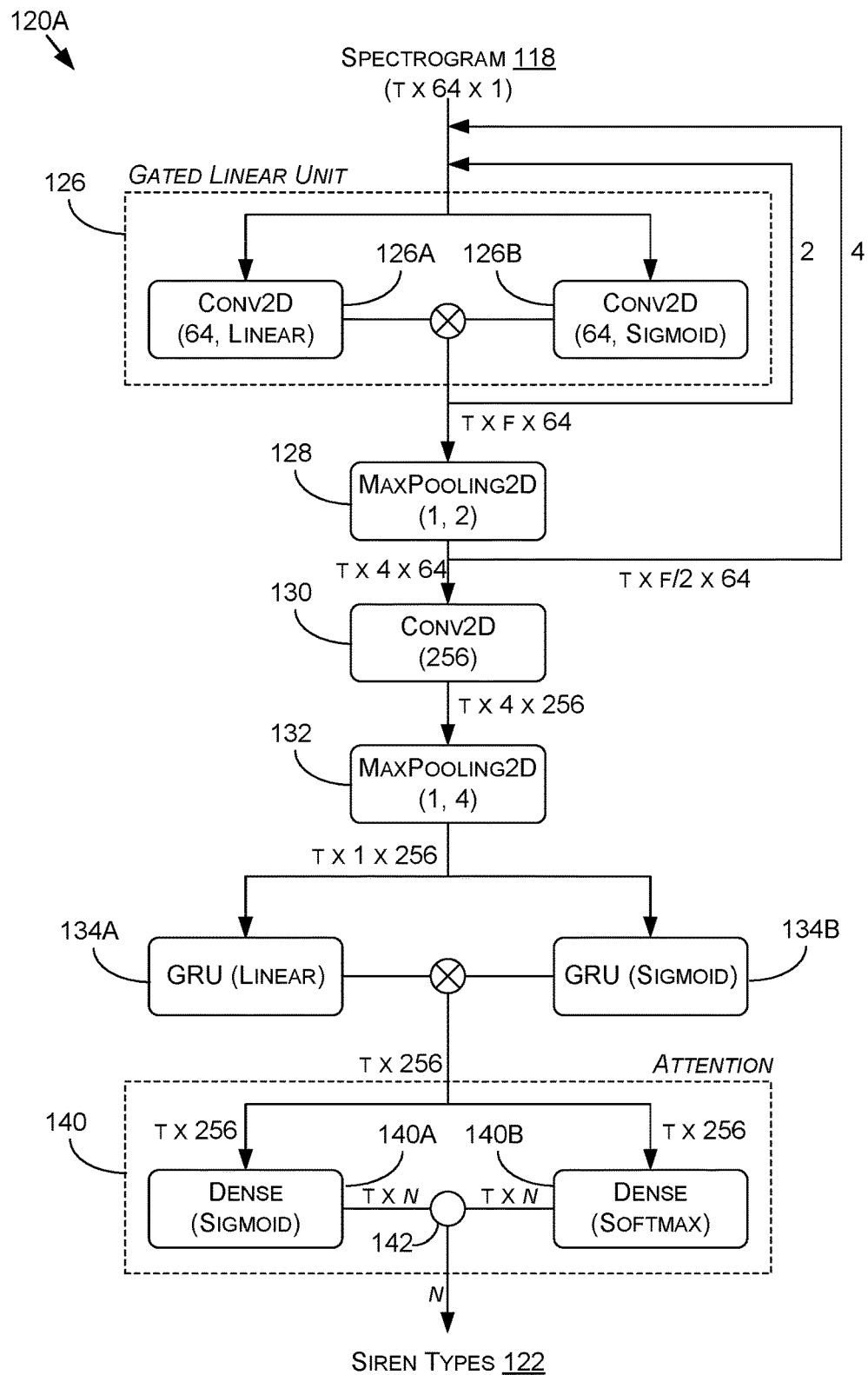
FIG. 1B depicts an example architecture for a deep neural network, in accordance with embodiments of the present disclosure.

With reference to FIG. 1B, an example architecture for a DNN 120A (e.g., a CRNN) is illustrated. T may correspond to time, which may be a time window that the spectrogram corresponds to. In some embodiments, T may be 250 milliseconds (ms), 500 ms, 800 ms, or another time window. F may correspond to frequency. The DNN 120A may include a series of convolutions followed by a series of RNNs. The convolutional layers (or feature detector layers) may generally be used to learn the unique spatial features of the spectrogram 118 that are useful for classification. In the architecture of FIG. 1B, the convolutions are replaced with gated linear units (GLUs) 126—e.g., GLU 126A and GLU 126B—to increase accuracy and allow faster convergence during training with a smaller training dataset. The outputs of the GLU 126A and 126B may be multiplied and applied to a max pooling layer 128, a convolutional layer 130, and another max pooling layer 132. The output of the max pooling layer 132 may be applied to one or more RNNs—or stateful layers—of the DNN 120A. For example, the user of stateful RNNs may aid in identifying longer alert sequences. The DNN 120A may use gated RNNs—such as gated recurrent units 134A and 134B—to increase accuracy with respect to sequences (e.g., alerts generally follow a predetermined pattern of sounds) while also being lightweight and faster to convergence during training using a smaller training dataset. In addition, to optimize between latency and accuracy, the DNN 120A may operate on a window of audio data (as represented by the Mel spectrogram) per inference while retaining the states of the GRUs 134 such that subsequent inference can continue on the audio sequence. The outputs of the RNNs—e.g., the GRUs 134—may be multiplied, and applied to one or more attention layers 140. For example, the outputs of the GRUs 134 may be applied to a dense layer with a sigmoid activation function and a dense layer with a SoftMax activation function, and the outputs of both dense layers maybe undergo a weighted mean operation 142 to generate a final output of confidences or probabilities indicative of the siren types 122. The attention layers 140 may aid in determining where, within the time window defined by T, the siren starts. The attention layers 140 are thus used to determine the probabilities of each type of alert within the time window as a whole, giving higher weights to the siren, alarm, horn, or other produced sound pattern irrespective of its temporal location within the time window. The output of independent probabilities for different alert types within a time window allows for multiple alert types 122 to be detected at any given time. For example, in contrast to using confidences for a number of alerts that equate to 1, a probability for each alert type may be computed irrespective of the other alert type probabilities or confidences. In some embodiments, however, confidences may be used.

As a result, the GLUs 126 in the CRNN 100A may help the DNN learn the best features for different types of alerts quickly and without requiring large training datasets. In addition, the stateful GRUs 134 combined with the attention layers 140 help detect alerts within a time window while retaining long temporal dependency. This allows the DNN 120 to run faster as opposed to detecting sirens for each time frame in sequence—e.g., without a temporal element. In addition, by breaking the inference into smaller time windows, approximation of Doppler Effect may be more accurate. Further, using the attention layers 140 helps the DNN 120 detect an alert earlier with insignificant contributions to latency.

In order to train the DNN 120—e.g., the CRNN 100A—a training dataset may be generated. However, due to the difficulty in generating a real-world training data set that includes enough variation in alert types and transformation thereto due to physical properties of the environment, data augmentation may be used to train the DNN 120. For example, capturing real-world audio where alerts are present is challenging, but capturing this same audio in open air, in a tunnel, under different weather conditions, and/or under other different circumstances is even more challenging. The alert pattern may undergo a wide set of transformations prior to being captured by the microphones 102, such as Doppler, attenuation, echoes, reverberations, and/or the like. For the DNN 120 to accurately predict the alert types 122, the DNN 120 may be trained to identify the alert types 122 after these transformation have taken place.

As such, to generate a robust training set, a dataset of audio data including alerts (such as, for example and without limitation, sires, horns, alarms, or other produced sound patterns emitted by emergency response vehicles) may be generated—e.g., from real-world collection using a data collection vehicle, from audio tracks of alerts, from videos including associated audio of alerts, and/or the like. The instances of the training audio data may be tagged with semantic or class labels corresponding to the different alert types 122 represented therein. Instances of the training audio data may then undergo one or more transformations such as time stretch, time shift, pitch shift, dynamic range compression at different signal-to-noise (SNR) ratios, noise compression at different SNR ratios, and/or other transformation types. For example, a single instance may be used to generate any number of additional instances using different combinations of transformations. As such, a training data set may be augmented to generate an updated training set including some multiple of the original training data set size—e.g., 25×, 50×, etc.

Referring again to FIG. 1A, the alert types 122 may include a type of emergency response vehicle—e.g., such that two or more alert types 122 may include a same name, such as "fire truck," "police car," or "ambulance." In other embodiments, the alert types 122 may include different alert types without an association to a type of emergency response vehicle—e.g., such as "wail," "yelp," "warble," "air horn," "piercer," "whoop," "howler," "priority," "2-tone," "rumbler," etc. In some embodiments, a combination of these two may be used as the alert types 122—e.g., such as "police car: piercer," or "ambulance: wail." As such, depending on the outputs the DNN 120 is trained to detect, the probabilities or confidences output by the DNN 120 may correspond to alert types 122 of emergency response vehicle names, alert names, or a combination thereof.

In some embodiments, in addition to identifying alert types 122, travel direction 114, and/or location 112, some or all of this information may be fused with additional information types. For example, where perception from other sensors of the vehicle 500 (e.g., LiDAR, RADAR, cameras, etc., as described with respect to FIGS. 5A-5C), the results from the process 100 may be combined with the perception outputs of the vehicle 500 for redundancy or fusion to increase the robustness and accuracy of the results. As such, where the emergency response vehicle is identified and classified using object detection, for example, this perception output may be combined with the location 112, travel direction 114, alert types 122 (or emergency response vehicle types as determined therefrom) to update or verify the predictions. Further, in some embodiments, vehicle-to-vehicle communication may include an additional source of information for increasing the robustness or accuracy of the results. For example, other vehicles in the environment may share information with the vehicle 500 about detections (e.g., locations, travel directions, types, etc.) of emergency response vehicles.

The determined alert types 122—which may include one or more at any instance of the DNN 120—direction of travel of the emergency response vehicle, location of the emergency response vehicle, perception of the vehicle 500, and/or vehicle-to-vehicle communications may be used by an autonomous driving software stack (e.g., drive stack) 124 of the vehicle 500. For example, a perception layer of the drive stack 124 may use the process 100 to identify and locate emergency response vehicles for updating a world model (e.g., using a world model manager) to localize the emergency response vehicle to the world model. A planning layer of the drive stack 124 may use the location 112, travel direction 114, and/or alert type to determine a route or path plan that accounts for the emergency response vehicle—such as to slow down, pull over, come to a stop, and/or perform another operation. A control layer of the drive stack 124 may then use a route or path plan to control the vehicle 500 according to the path. In some embodiments, identification of an emergency response vehicle may trigger a tele or remote operation request. For a non-limiting example, remote operation may be requested and executed similar to the remote operation described in U.S. Non-Provisional application Ser. No. 16/366,506, filed on Mar. 27, 2019, which is hereby incorporated by reference in its entirety. As such, the drive stack 124 may use the alert types 122 (and/or the corresponding emergency response vehicle type or emergency type, as indicated by the alert type 122), the location 112, and/or the travel direction 114 to perform one or more operations to account for the presence of the emergency response vehicle(s) in the environment.

Figure 3:
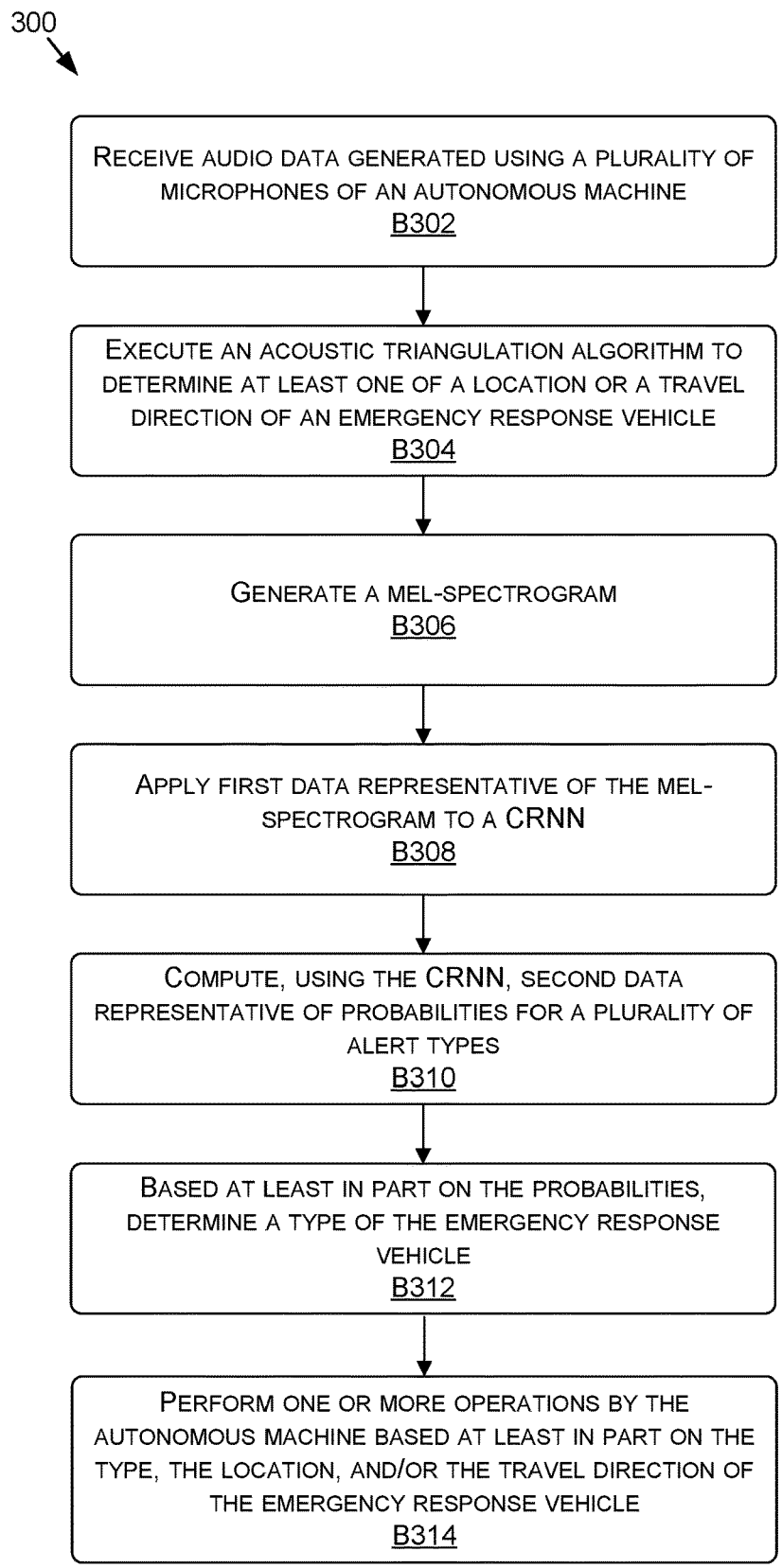
FIGS. 3-4 depict flow diagrams of methods for emergency response vehicle detection, in accordance with embodiments of the present disclosure.
Figure 4:
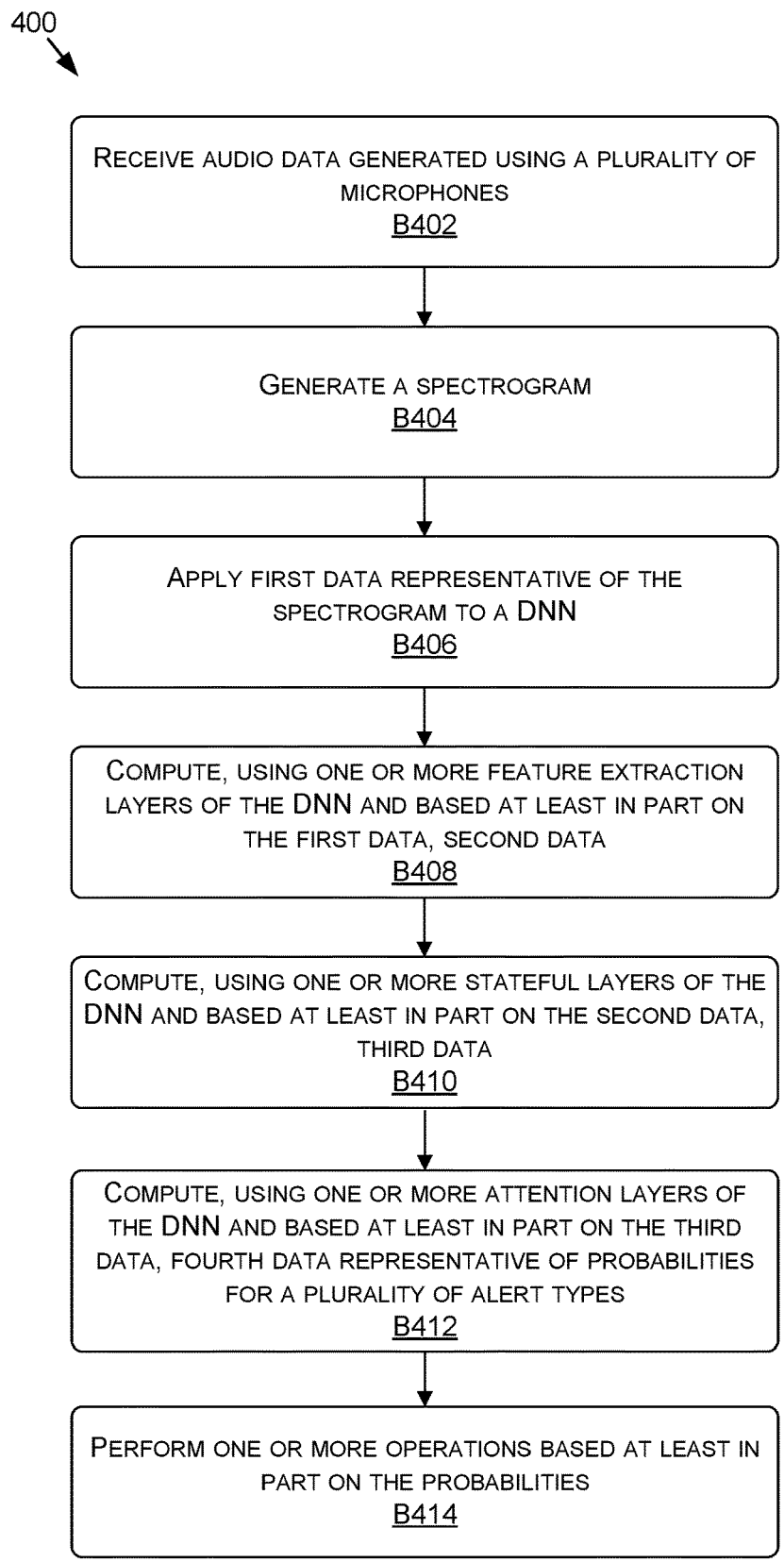

Now referring to FIGS. 3-4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, methods 300 and 400 are described, by way of example, with respect to the process 100 of FIG. 1A and the autonomous vehicle 500 of FIGS. 5A-5D. However, these methods may additionally or alternatively be executed by any one process and/or any one system, or any combination of processes and systems, including, but not limited to, those described herein.

With reference to FIG. 3, FIG. 3 is a flow diagram showing a method 300 for emergency response vehicle detection, in accordance with some embodiments of the present disclosure. The method 300, at block B302, includes receiving audio data generated using a plurality of microphones of an autonomous machine. For example, the audio data 104 may be generated using the microphones 102—e.g., the microphones 102 of the microphone arrays 202.

The method 300, at block B304, includes executing an acoustic triangulation algorithm to determine at least one of a location or a travel direction of an emergency response vehicle. For example, the audio data 104 (before or after pre-processing by the pre-processor 106) may be used by the location determiner 108 to determine the location 112 and/or the travel direction 114.

The process 300, at block B306, includes generating a Mel-spectrogram. For example, the spectrogram generator 116 may generate the (Mel-) spectrogram 118 (or another representation of a spectrum of one or more frequencies corresponding to a one or more audio signals from the audio data) using the audio data 104.

The process 300, at block B308, includes applying first data representative of the Mel-spectrogram to a CRNN. For example, data representative of the (Mel-) spectrogram 118 may be applied to the DNN 120 (e.g., the CRNN 110A).

The process 300, at block B310, includes computing, using the CRNN, second data representative of probabilities for a plurality of alert types. For example, the CRNN may compute outputs corresponding to probabilities for a plurality of alert types 122.

The method 300, at block B312, includes, based at least in part on the probabilities, determining a type of the emergency response vehicle. For example, the alert type(s) 122 with the highest probability (or a probability above a threshold) may be determined to be present, and the type(s) of emergency response vehicle(s) associated with the alert type(s) 122 may be determined. In some embodiments, the thresholds may be adjusted based on location of the vehicle 500 and/or other information. For example, vehicle-to-vehicle communications indicating an accident nearby, SigAlert, and/or a structure, forest, roadside, or other fire type may be used, in addition to or alternatively from a location of the vehicle 500 (as determined using GNSS, an HD map, vehicle perception, etc.) being near a hospital, fire station, police station, etc. to lower the confidence or probability thresholds due to the increased likelihood that an emergency response may be in the area.

The method 300, at block B314, includes performing one or more operations by the autonomous machine based at least in part on the type, the location, and/or the travel direction of the emergency response vehicle. For example, the type of emergency response vehicle (and/or the alert type 122), the location 112, and/or the travel direction 114 may be used to perform one or more operations—such as to comply with rules or conventions of the locale with respect to emergency response vehicles.

With reference to FIG. 4, FIG. 4 is a flow diagram showing a method 400 for emergency response vehicle detection, in accordance with some embodiments of the present disclosure. The method 400, at block B402, includes receiving audio data generated using a plurality of microphones. For example, the audio data 104 may be generated using the microphones 102—e.g., the microphones 102 of the microphone arrays 202.

The process 400, at block B406, includes generating a spectrogram. For example, the spectrogram generator 116 may generate the spectrogram 118 (or another representation of a spectrum of one or more frequencies corresponding to a one or more audio signals from the audio data) using the audio data 104.

The process 400, at block B408, includes applying first data representative of the spectrogram to a DNN. For example, data representative of the spectrogram 118 may be applied to the DNN 120 (e.g., the CRNN 110A).

The process 400, at block B410, includes computing, using one or more feature extraction layers of the DNN and based at least in part on the first data, second data. For example, the GLUs 126 may be used to compute feature maps or feature vectors using data representative of the spectrogram 118.

The process 400, at block B412, includes computing, using one or more stateful layers of the DNN and based at least in part on the second data, third data. For example, the GRUs 134 may compute outputs from the output of the GLUs 126—e.g., before or after processing by one or more additional layers, such as layers 128, 130, and/or 132.

The process 400, at block B414, includes computing, using one or more attention layers of the DNN and based at least in part on the third data, fourth data representative of probabilities for a plurality of alert types. For example, the dense layers 140 of the DNN 120 may be used to compute outputs indicative of probabilities for a plurality of alert types 122.

The method 400, at block B416, includes performing one or more operations based at least in part on the probabilities. For example, the type of emergency response vehicle (and/or the alert type 122), the location 112, and/or the travel direction 114 may be used to perform one or more operations—such as to comply with rules or conventions of the locale with respect to emergency response vehicles.

Example Autonomous Vehicle

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RB GC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency response vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency response vehicle detection and identification may use data from microphones 596 to detect and identify emergency response vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency response vehicle (e.g., by using the Doppler Effect). The CNN may also be trained to identify emergency response vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency response vehicle is detected, a control program may be used to execute an emergency response vehicle safety routine, slowing the vehicle, pulling over to the side of the road, parking the vehicle, and/or idling the vehicle, with the assistance of ultrasonic sensors 562, until the emergency response vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN, Ethernet, and/or FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency response vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
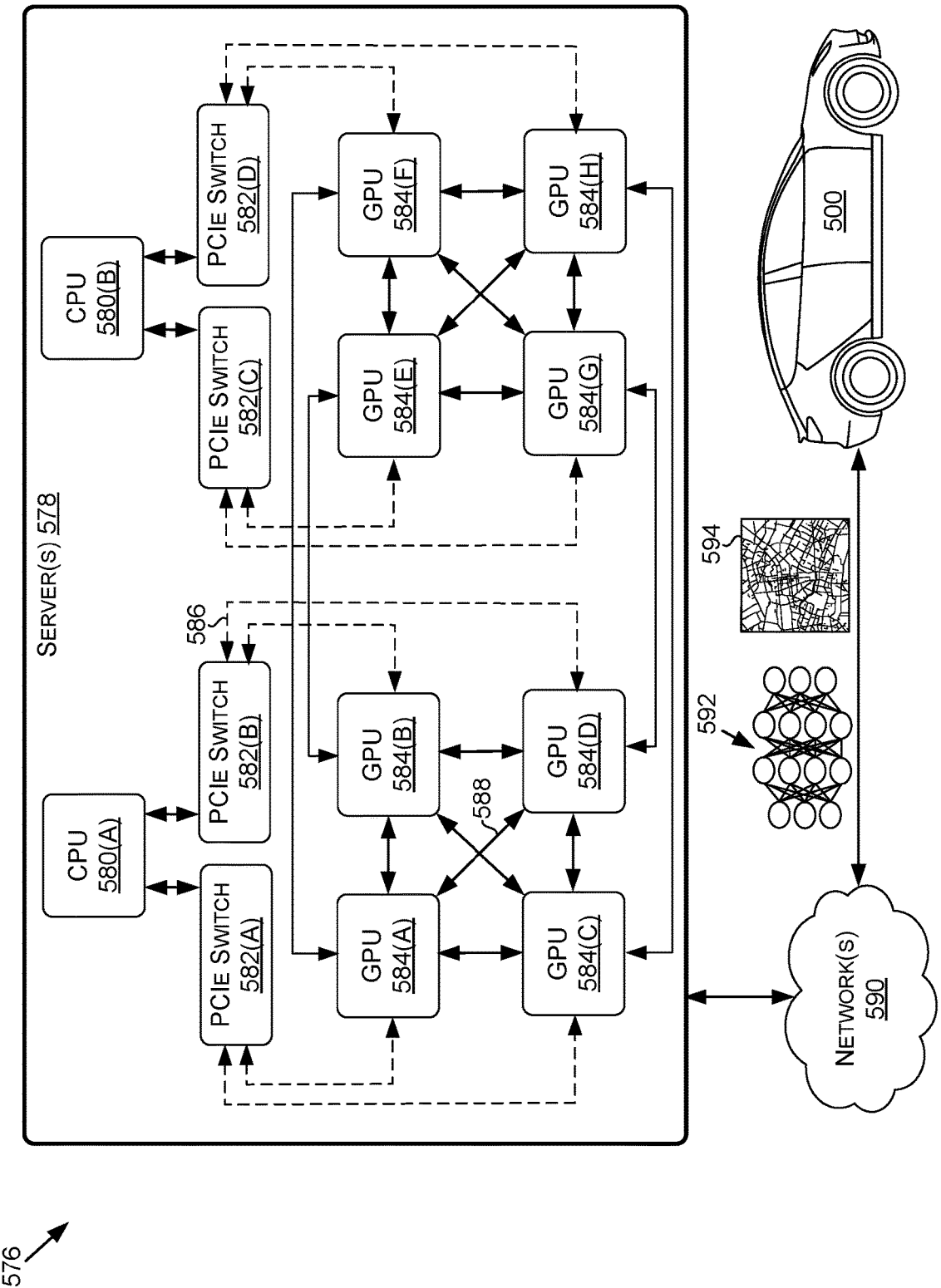
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
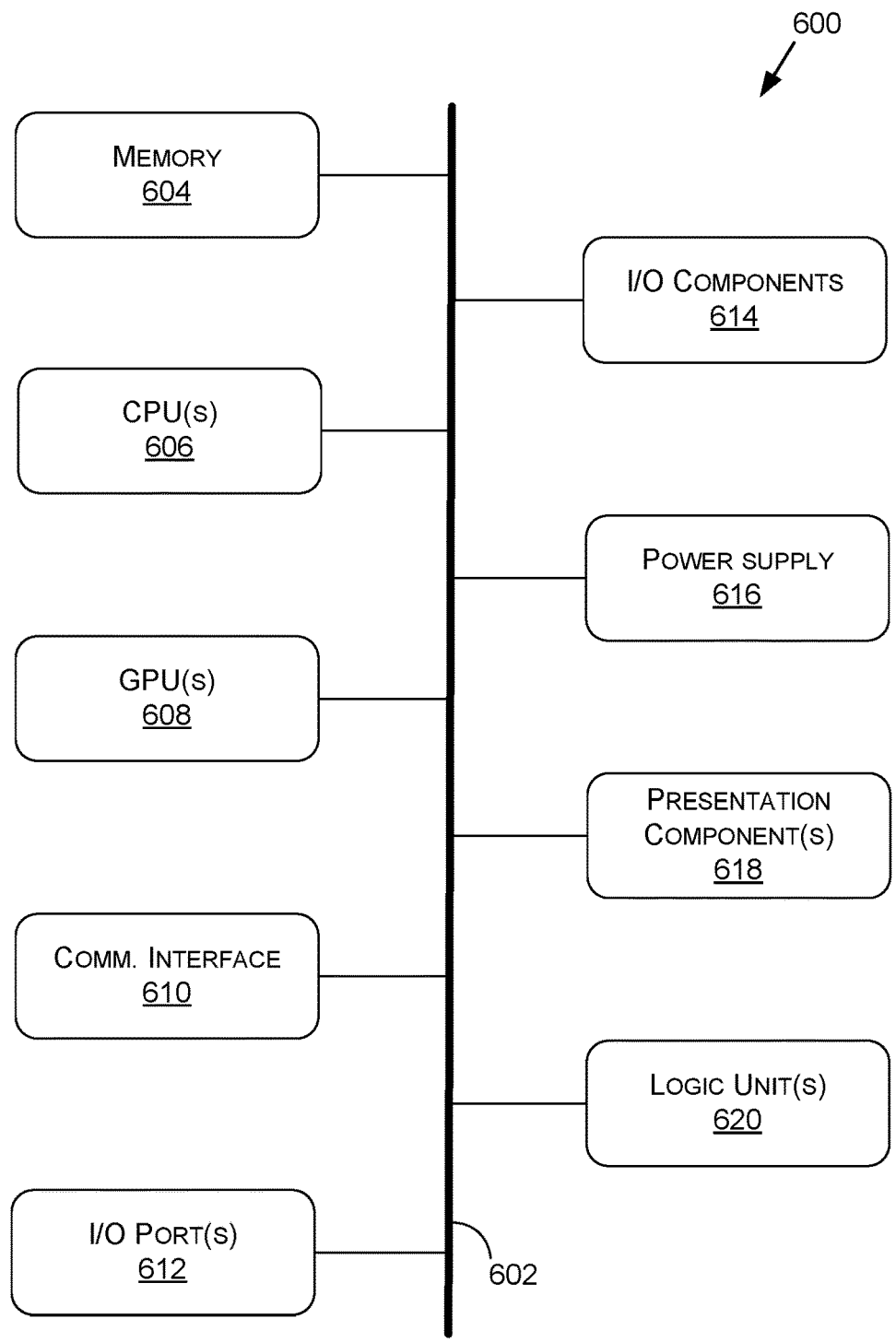
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
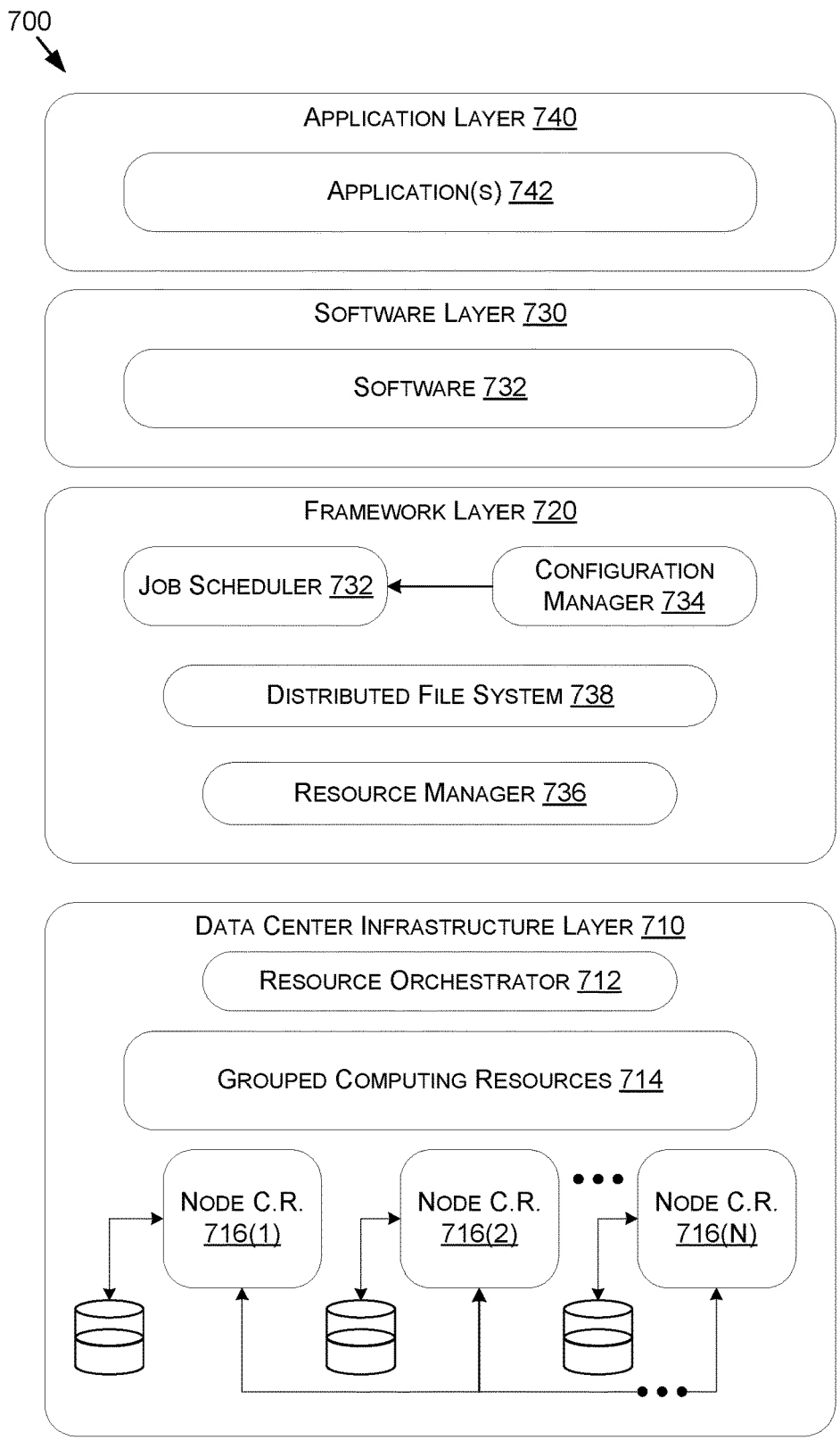
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 722 may configure or otherwise control one or more node C.R.s 716(1)-716(N) and/or grouped computing resources 714. In at least one embodiment, resource orchestrator 722 may include a software design infrastructure ("SDI") management entity for the data center 700. The resource orchestrator 722 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 1036 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, using one or more neural networks and based at least on first audio data generated using one or more microphones of a machine during a first time window, one or more first probabilities associated with one or more alert types;
   determining, using the one or more neural networks and based at least on second audio data generated using the one or more microphones during a second time window, one or more second probabilities associated with the one or more alert types, the first time window being offset with respect to the second time window and a portion of the second audio data including a portion of the first audio data; and
   causing, based at least on the one or more first probabilities and the one or more second probabilities, the machine to perform one or more operations.

2. The method of claim 1, further comprising:
   determining, based at least on the one or more first probabilities and the one or more second probabilities, an alert type from the one or more alert types,
   wherein the causing the machine to perform the one or more operations is based at least on the alert type.

3. The method of claim 1, further comprising:
   determining, based at least on the one or more first probabilities and the one or more second probabilities, a type of an emergency response vehicle,
   wherein the causing the machine to perform the one or more operations is based at least on the type of the emergency response vehicle.

4. The method of claim 3, wherein the determining the type of emergency alert vehicle comprises:
   determining, based at least on the one or more first probabilities, the type of the emergency response vehicle; and
   verifying, based at least on the one or more second probabilities, the type of the emergency response vehicle.

5. The method of claim 1, further comprising:
   determining, based at least on one or more of the first audio data or the second audio data, a location associated with an emergency response vehicle,
   wherein the causing the machine to perform the one or more operations is further based at least on the location associated with the emergency response vehicle.

6. The method of claim 1, further comprising:
   determining, based at least on one or more of the first audio data or the second audio data, a direction of travel associated with an emergency response vehicle, wherein the causing the machine to perform the one or more operations is further based at least on the direction of travel associated with the emergency response vehicle.

7. The method of claim 1, further comprising:
determining, based at least on the one or more first probabilities and the one or more second probabilities, one or more third probabilities associated with the one or more alert types,
wherein the causing the machine to perform the one or more operations is based at least on the one or more third probabilities.

8. The method of claim 1, further comprising:
maintaining one or more states associated with the one or more first probabilities associated with the one or more alert types,
wherein the determining the one or more second probabilities associated with the one or more alert types is further based at least on the one or more states.

9. The method of claim 1, wherein the one or more alert types correspond to at least one of:
a siren;
a sequence or pattern of one or more sirens;
an alarm;
a sequence or pattern of one or more alarms;
one or more emissions from a vehicle horn; or
a sequence or pattern of emissions from at least one vehicle horn.

10. A system comprising:
one or more processing units to:
determine, using one or more neural networks and based at least on first audio data generated using one or more microphones of a machine during a first time period, first information associated with one or more alert types;
determine, using the one or more neural networks and based at least on second audio data generated using the one or more microphones during a second time period that is different than the first time period, second information associated with the one or more alert types, a portion of the second time period including a portion of the first time period such that a portion of the second audio data includes a portion of the first audio data; and
cause, based at least on the first information and the second information, the machine to perform one or more operations.

11. The system of claim 10, wherein:
the first information includes at least one of one or more first probabilities associated with the one or more alert types or a first indication of an alert type of the one or more alert types; and
the second information includes at least one of one or more second probabilities associated with the one or more alert types or a second indication of the alert type of the one or more alert types.

12. The system of claim 10, wherein the one or more processing units are further to:
determine, based at least on the first information and the second information, an alert type from the one or more alert types,
wherein the machine is caused to perform the one or more operations based at least on the alert type.

13. The system of claim 10, wherein the one or more processing units are further to:
determine, based at least on the first information and the second information, a type of an emergency response vehicle,
wherein the machine is caused to perform the one or more operations based at least on the type of the emergency response vehicle.

14. The system of claim 10, one or more processing units are further to:
determine, based at least on one or more of the first audio data or the second audio data, a location associated with an emergency response vehicle,
wherein the machine is further caused to perform the one or more operations based at least on the location associated with the emergency response vehicle.

15. The system of claim 10, wherein the one or more processing units are further to:
determine, based at least on one or more of the first audio data or the second audio data, a direction of travel associated with an emergency response vehicle,
wherein the machine is further caused to perform the one or more operations based at least on the direction of travel associated with the emergency response vehicle.

16. The system of claim 10, wherein the one or more processing units are further to:
maintain one or more states associated with the first information associated with the one or more alert types,
wherein the determination of the second information associated with the one or more alert types is further based at least on the one or more states.

17. The system of claim 10, wherein the system is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

18. A processor comprising:
one or more processing units to cause a machine to perform one or more operations based at least on information associated with one or more alert types, wherein the information is determined using one or more neural networks and based at least on the one or more neural networks processing first audio data and second audio data obtained using one or more microphones of the machine, the first audio data associated with a first time window that is offset from and at least partially overlaps with a second time window associated with the second audio data.

19. The processor of claim 18, wherein the one or more processing units are further to:
determine, based at least on the information, a type of an emergency response vehicle,
wherein the machine is caused to perform the one or more operations based at least on the type of the emergency response vehicle.

20. The processor of claim 18, wherein the processor is comprised in at least one of:
- a control system for an autonomous or semi-autonomous machine;
- a perception system for an autonomous or semi-autonomous machine;
- a system for performing simulation operations;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

* * * * *